United States Patent [19]

Camplin et al.

[11] Patent Number: 4,767,425
[45] Date of Patent: Aug. 30, 1988

[54] ASPIRATOR MECHANISM FOR TURBINE ENGINE AIR CLEANER

[75] Inventors: Harry R. Camplin, Marine; Donald R. Monson, St. Paul, both of Minn.

[73] Assignee: The United States of America as represented by the Secretary of the Army, Washington, D.C.

[21] Appl. No.: 70,752

[22] Filed: Jul. 6, 1987

[51] Int. Cl.⁴ .............................................. B01D 45/04
[52] U.S. Cl. ....................................... 55/306; 55/337; 55/348; 55/431; 60/39.092
[58] Field of Search ................. 55/282, 306, 337, 345, 55/346, 348, 431, 467, 468; 60/39.092

[56] References Cited

U.S. PATENT DOCUMENTS

| | | | |
|---|---|---|---|
| 3,469,566 | 9/1969 | Wilkinsop et al. | 55/348 X |
| 3,766,719 | 10/1973 | McAnally | 55/306 |
| 4,242,115 | 12/1980 | Harold et al. | 55/431 X |
| 4,266,953 | 5/1981 | Matthys et al. | 55/294 |
| 4,291,530 | 9/1981 | Ballard | 60/39.092 |
| 4,514,193 | 4/1985 | Booth | 55/337 X |
| 4,537,608 | 8/1985 | Koslow | 55/337 |

Primary Examiner—Charles Hart
Attorney, Agent, or Firm—Peter A. Taucher; David L. Kuhn

[57] ABSTRACT

A known military tank is powered by a turbine engine having a large capacity air filter unit; a fan is ordinarily employed to draw dust-laden air from the filter unit. Erosion of the fan blades by fast-moving dust particles is a problem. We have substituted for the fan an aspirator mechanism; fast moving combustion products flowing through the engine exhaust duct draw dust-laden air from the filter unit through a slot-like orifice in one wall of the duct.

20 Claims, 4 Drawing Sheets

ASPIRATOR MECHANISM FOR TURBINE ENGINE AIR CLEANER

GOVERNMENT INTEREST

The Government has rights in this invention pursuant to Contract DAAK30-80-C-0095 awarded by Department of the Army to the Donaldson Company.

BACKGROUND AND SUMMARY OF THE INVENTION

The M-1 tank used by U.S. military forces is driven by a turbine engine. The air cleaner for this turbine engine is an upright box-like structure having two types of air cleaning devices therein. In the upper section of the box there is a bank of small inertial separator tubes (approximately 400 tubes). These tubes remove more than 90 percent of the dust in the airstream supplied to the box. In the lower section of the box there are two air filter panels formed of pleated fabric material (paper); dust particles in the partially cleaned air stream are trapped on the upstream faces of the pleated fabric material. Sufficient dust is collected by the filter panels to bring the overall collection efficiency of the air cleaner above 99%.

For proper operation the inertial separation tubes must be exposed to a scavenger suction force (in order to pull dust concentrates out of the tubes and deliver same to a point outside the vehicle). Conventionally the scavenger suction force is provided by a special duct containing a motor-operated fan.

The turbine engines require large quantities of air. As a consequence the scavenger fan handles relatively large air quantities. Erosion of the fan blades is a maintenance problem.

The present invention relates to an aspirator mechanism that can be used in place of the scavenger fan heretofore used. The aspirator mechanism preferably comprises a flat rectangular chamber located on the undersurface of the engine exhaust duct just downstream from a gas-turning zone at the engine exhaust opening. A suitable passage structure extends from the filter box to the flat chamber.

The flat chamber is connected to the engine exhaust duct via a slot-like orifice extending entirely across the duct width. The stream of gas flowing through the exhaust duct applies a vacuum force to the orifice, to thereby draw dust-laden air out of the aforementioned chamber into the gas stream exiting from the engine.

The chamber and aspirator orifice are located at the inside turn of a gas-turning elbow section in the exhaust duct, so as to take advantage of inertia forces associated with the gas turn action. Dust-laden air is moved into an otherwise turbulent zone (at the inside of the turn) which would generate flow losses and back pressure on the engine. The aspirator will not improve engine performance, but it will perform its dust-removal function with relatively minor negative effects on engine performance, especially when the engine is operating at low power levels.

ENGINE-FILTER BOX ARRANGEMENT

Figure 1:
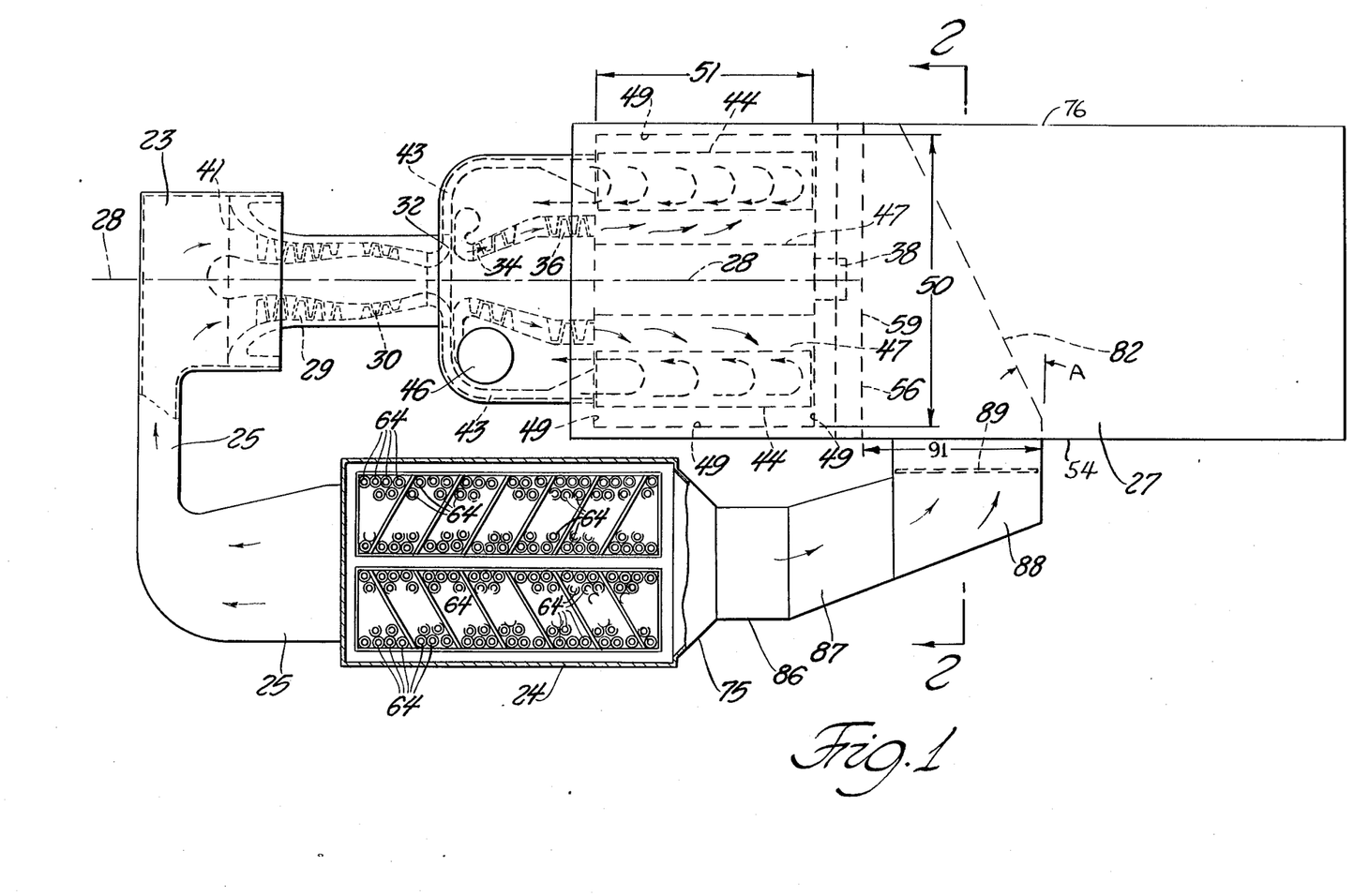
FIG. 1 is a top plan view of a turbine engine using our invention.
Figure 2:
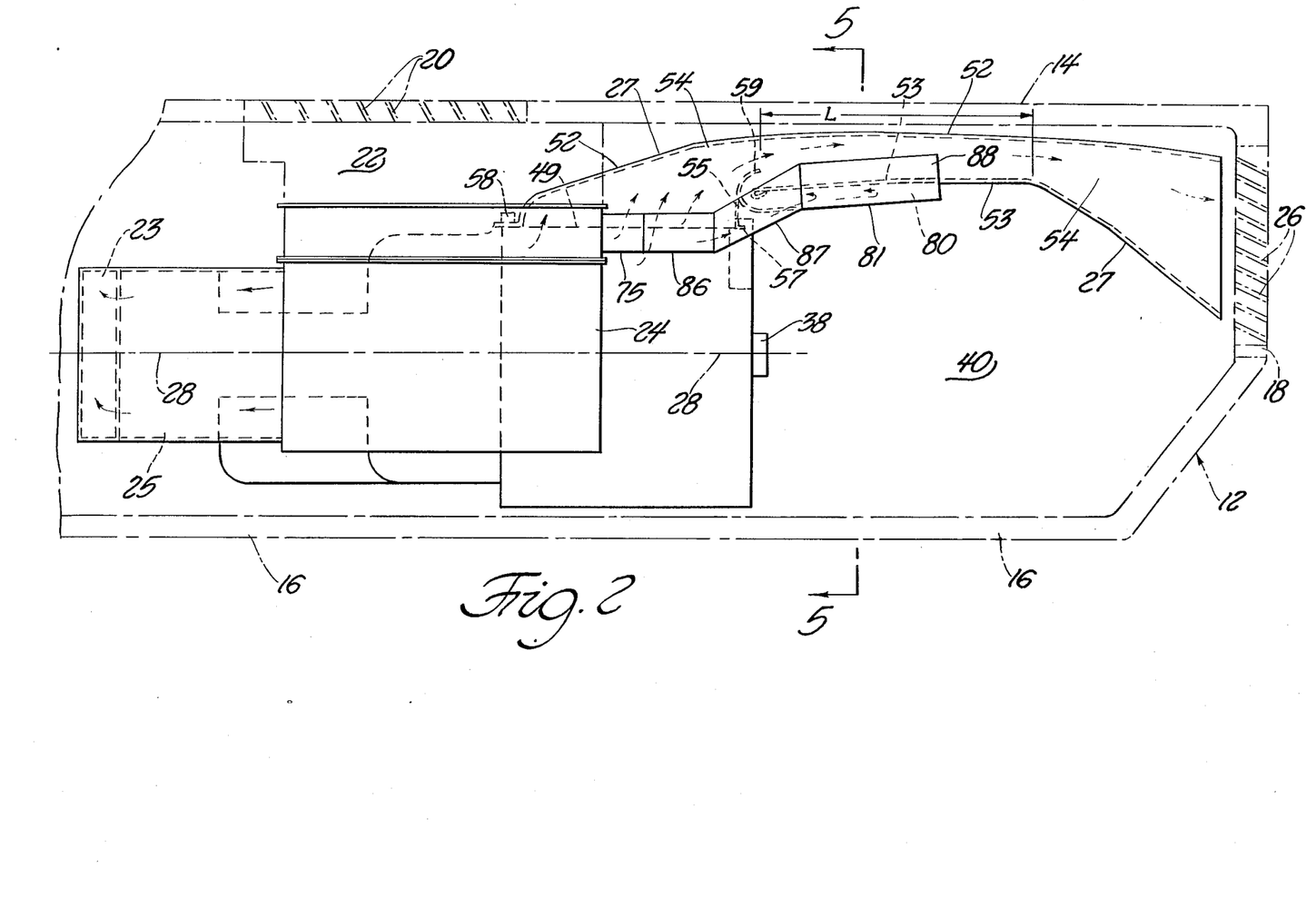
FIG. 2 is a side elevational view of the FIG. 1 engine.
Figure 3:
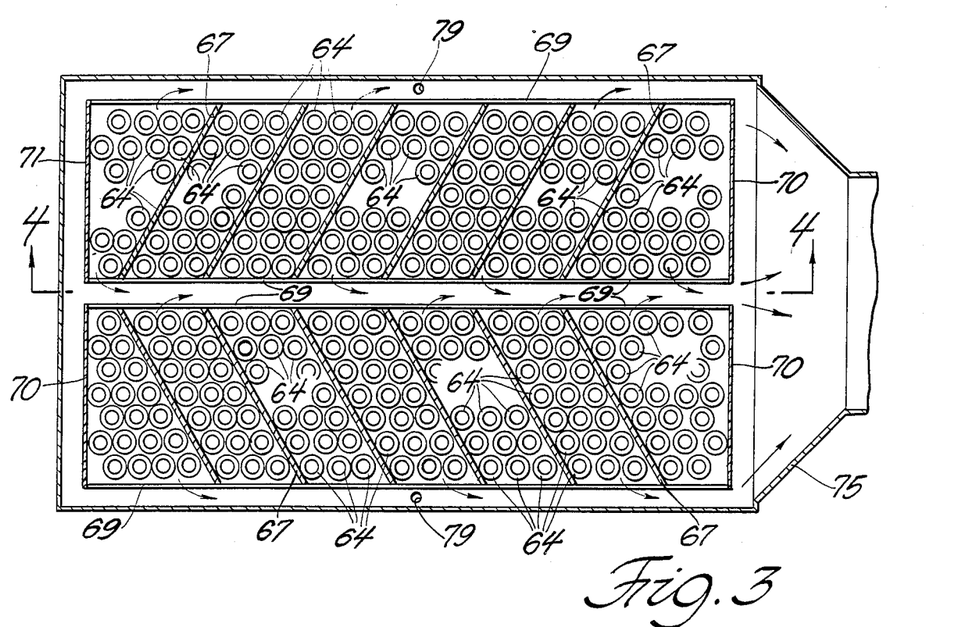
FIG. 3 is a sectional view of an air cleaner box used in the FIG. 1 engine, taken on line 3—3 in FIG. 4.

FIGS. 1 through 3 illustrate the general arrangement in which our invention is used. A turbine engine 10 is located within a vehicle (military tank) hull 12 shown in dashed lines (FIG. 2). The hull includes an upper wall 14, lower wall 16, and rear wall 18. Louvered openings 20 in wall 14 admit raw air to a confined space 22 directly above rectangular air cleaner box 24. Louvered openings 26 in hull wall 18 direct combustion products from engine exhaust duct 27 outwardly (rearwardly) to a point outside the vehicle.

Air cleaner box 24 has an opening in its front wall that communicates with a clean air passage means 25. The defined passage extends leftwardly (in FIG. 1), then laterally to connect with a chamber 23 at the front end of the turbine engine. The air flows from chamber 23 directly into the engine.

Turbine engine 10 comprises an engine housing having internal shaft-turbine assemblies mounted therein for rotation on a horizontal axis 28. The turbine components cooperate with stationary vane structures to define a low pressure axial compressor section 29, high pressure axial compressor section 30, centrifugal compressor section 32, high pressure power turbine section 34, and low pressure (compressor drive) turbine section 36. A power output shaft 38 connects with a non-illustrated transmission located in space 40 (FIG. 2).

Raw air is admitted to the engine from aforementioned chamber 23 through an annular vertically oriented intake opening 41. In FIG. 1 the air flows in a left-to-right direction, from intake opening 41 through the compressor sections. Compressed air exits from centrifugal compressor 32 into an annular diffuser 43 that connects with passages in an annular recuperator (heat exchanger) 44. Heated air flows in a reverse direction from the recuperator to a can-type combustor 46, which supplies pressurized combustion products to the turbine sections 34 and 36. The spent gases flow into an annular chamber 47, and thence radially outwardly through passages in recuperator 44. The gases exit from the engine, as an upward flow through a horizontally oriented exhaust opening 49 in an upper flat surface of the engine.

As seen in FIG. 1 (in top plan), exhaust opening 49 is a large rectangular opening having a transverse width dimension 50 and an axial dimension 51. Combustion products are exhausted upwardly through opening 49 into the aforementioned exhaust duct 27. As the gases emerge from opening 49 the roof section 52 of the duct (FIG. 2) forces the gases to turn from a generally vertical path into a horizontal path. Flow along duct 27 is then generally horizontal, as shown by the arrows in FIG. 2.

Figure 5:
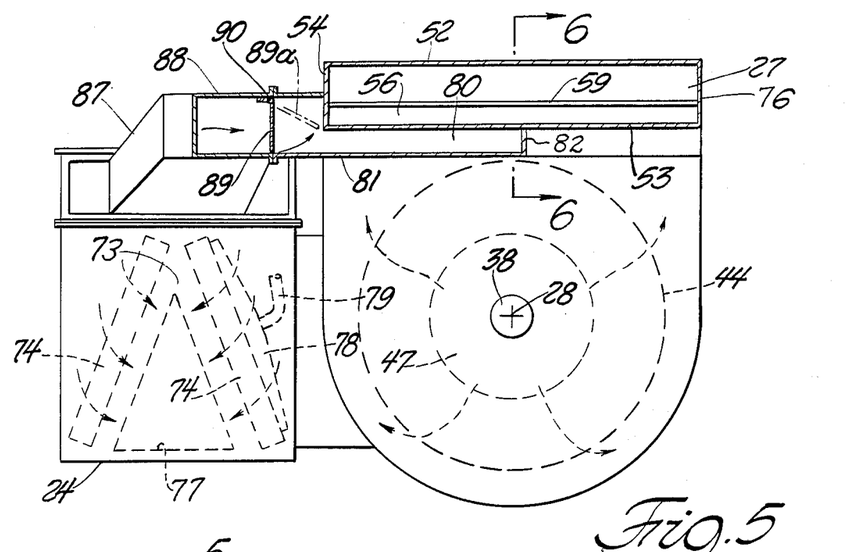
FIG. 5 is a sectional view taken on line 5—5 in FIG. 2.

As best seen in FIG. 5 duct 27, has a generally rectangular cross section, defined by a relatively flat roof 52, flat floor 53, and two interconnecting side walls 54 and 76. Duct 27 also includes a short upstanding wall 55

(FIGS. 2 and 6) extending from the right edge of engine exhaust opening 49.

Figure 6:
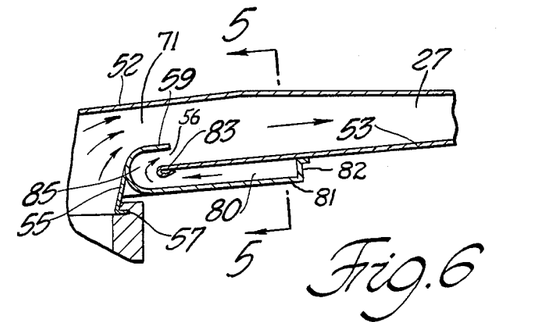
FIG. 6 is a sectional view on line 6—6 in FIG. 5.
Figure 7:
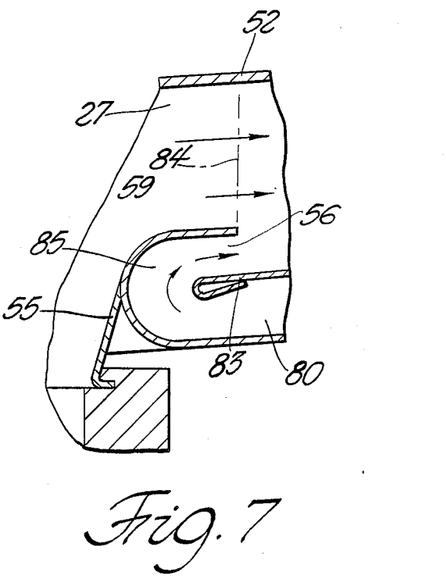
FIG. 7 is a fragmentary view in the same direction as FIG. 6, but to a larger scale.

The sloping frontal area of duct roof wall 52 cooperates with duct wall 55 to form a gas-turning elbow section. As the exhaust gases flow upwardly out of exhaust opening 49 the sloping section of duct wall 52 turns the gases horizontally. Wall 55 (on the inner side of the turn) connects with a curved wall 59 to define an inner boundary surface for the gases as they turn from an upflow direction to the horizontal direction. FIGS. 6 and 7 show the wall configuration at the inner turning zone of the elbow section.

AIR CLEANER CONSTRUCTION

Figure 4:
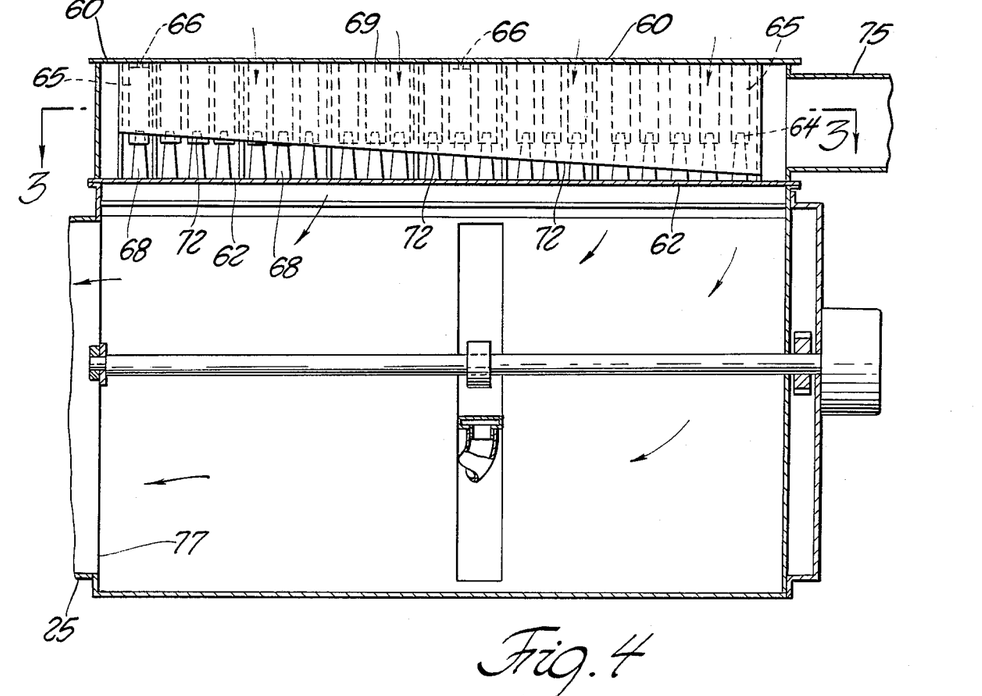
FIG. 4 is a sectional view taken on line 4—4 in FIG. 3.

FIGS. 3 through 5 illustrate the general features of air cleaning mechanisms contained within air cleaner box 24. The box upper section includes a horizontal top plate 60, intermediate plate 62, and a plural number of inertial separator tube units 64. Each inertial separator unit 64 comprises a cylindrical tube 65 depending from plate 60, and a frusto-conical tube 68 extending upwardly from plate 62 into the lower portion of the associated tube 65. Circular openings are preformed in plates 60 and 62 to mount the tubes and form inlet/outlet openings for air flow through the tubes. Spinner vanes 66 are mounted in the upper (inlet) ends of tubes 65.

As the air flows downwardly into each tube 65 the spinner vanes induce a centrifugal swirling motion in the air stream. Dust particles are centrifuged out of the air stream through the annular space formed between the inner surface of tube 65 and the outer surface of tube 68.

As best seen in FIG. 3, the inertial separator units 64 are grouped together in units separated from each other by vertical imperforate partitions 67 extending between longitudinal walls 69. The lower edge 72 of each wall 69 is spaced from plate 62, to form an exit flow opening for each group of inertial separator units. Internal imperforate end walls 70 prevent flow of the air around the flow openings in walls 69.

The right (rear) wall of the box upper section connects to a passage structure 75 that is in communication with a vacuum source (to be described later). Vacuum force is applied through passage structure 75 to the various flow openings formed by the lower edges 72 of walls 69, such that a sub-atmospheric pressure condition is produced in the space surrounding each separator tube unit 64. A sub-atmospheric pressure condition is necessary to produce a continuous flow of dust-concentrated air from each unit 64. A variable spacing of each edge 72 from plate 62 (as shown in FIG. 4) ensures that each unit 64 will be subjected to approximately the same vacuum force.

Dust-concentrated air is drawn from inertial separator units 64 into passage structure 75, as shown generally by the flow lines in FIG. 3.

SECOND AIR CLEANER STAGE

Partially cleaned air (devoid of the larger dust particles) flows downwardly through tubes 68 into the lower section of box 24. As best seen in FIG. 5, the box has two upright filter panels 74 arranged therein, in an inverted V-shaped pattern. Partially-cleaned air flows transversely through the panels into a central space 73. The front wall of box 24 has a triangular opening 77 therethrough, whereby cleaned air is drawn from space 73 into the aforementioned clean air passage 25.

The action of the aforementioned compressor sections 29, 30 and 32 provides the necessary suction force for drawing air into the filter box and through passage 25.

The upstream faces of air filter panels 74 may be periodically cleaned by "reverse air flow" devices of the type shown in U.S. Pat. No. 4,266,953 issued to B. Mathys, D. Schoen, and C. Anderson. Each reverse air flow device includes a movable receiver 78 having a flexible tube 79 (FIG. 5) extending upwardly to aforementioned plate 62. The vacuum condition existing in the upper section of box 24 draws air (and entrained dust) upwardly through tube 79 for subsequent outflow through passag structure 75.

ASPIRATOR MECHANISM

Our invention relates primarily to an aspirator mechanism connected to the undersurface of exhaust duct 27. The aspirator mechanism comprises a relatively flat chamber 80 defined between the lower surface of duct wall 53 and the upper surface of horizontal wall 81 (FIG. 5). Chamber 80 is further defined by a transverse wall 82 interconnecting walls 53 and 81.

Wall 81 extends leftwardly from wall 82 to the aforementioned inner wall 55 of the duct elbow section. As best seen in FIG. 6, the left end portion of wall 81 is curved upwardly and then rearwardly, as at 59. End area 83 of duct floor section 53 is spaced to the right of curved wall section 59, to form a U-shaped passage 85. Air flows from chamber 80 through passage 85 and eventually into duct 27 (through orifice 56). The downstream edge of wall section 59 cooperates with end area 83 of floor section 53 to define a slot-type orifice 56. The space between wall section 59 and roof wall 52 forms a nozzle 71. Flow of exhaust gas through nozzle 71 induces a flow of dust-laden air from passage 85 through orifice 56, as shown by the flow arrows in FIGS. 6 and 7.

The left end of wall section 83 is located slightly upstream from the plane of orifice 56 (designated by imaginary line 84 in FIG. 7), such that dust-laden air is required to flow over the upper surface of floor section 83 before reaching the orifice. The intent is to guide and confine the flow so that the dust-laden air is moving generally normal to plane 84 of the orifice when it reaches the orifice. The flow will then be well defined and relatively non-turbulent, with relatively low orifice discharge loss. The result will be a relatively high induced flow rate for a given suction force.

Flow of dust-laden air through orifice 56 results from the flow of exhaust gas through duct 27. Initially the exhaust gas flows upwardly through opening 49 (FIG. 2). As it encounters the sloping wall 52 the gas is turned into a generally horizontal direction by the time it reaches the plane of orifice 56. Inertia forces associated with the turning action cause the mass flow rate to be relatively high near the outside of the turn (near wall 52) and relatively low near the inside of the turn (at the upper surface of curved 10 wall 59).

The fast-moving gas near wall 52 tends to pull the slower-moving gas up to its own speed; in the process a suction force is applied to the dust-laden air in orifice 56. As will be apparent from FIGS. 1 and 5, slot-type orifice 56 extends the full transverse width of duct 27, i.e. the entire distance between duct side walls 54 and 76. This dimensional feature tends to produce a relatively high mass flow rate of dust-laden air through the orifice.

As seen in FIG. 1, wall 82 extends at an angle A to an imaginary line taken normal to the flow axis of duct 27. This angulation is designed to turn the gas flowing through chamber 80 back toward slot orifice 56. The wall 82 angulation also lessens the distance that the gas flowing along boudary wall 82 must travel before it reaches orificie 56. The intent is to provide a uniform, or nearly uniform, flow distribution of induced gas flow across orifice 56, from wall 54 to wall 76. Without the wall 82 angulation the orifice 56 flow would be undesirably low in the zone near wall 54 DRM. Wall 82 is shown in FIG. 1 as a flat (straight) wall that gives header chamber 80 a linear taper. Wall 82 could be curved (in top plan) to provide an optimum (more uniform) flow pattern through orifice 56. Optimum header design criteria are referenced in Transactions of the ASME, Journal of Engineering for Power, Volume 90, Series A, No. 3, July 1968 at pp. 271-286.

The section of duct 27 identified by letter L (FIG. 2) is a mixing area for the two gasses, i.e., the primary gas coming from exhaust openin 49 and the secondary gas flowing through slot orifice 56. Preferably mixing area L is of substantially constant cross sectional area, so that it does not act as a diffuser or gas expansion device; the general intent is to maintain a fairly high linear flow rate in the primary gas stream so as to generate a correspondingly high flow rate in the secondary stream (through orifice 56).

Mixing length L is preferably between three and six times the hydraulic diameter of the duct 27 cross section. Mathematically, hydraulic diameter of a duct is four times the duct cross sectional area divided by the duct perimeter. In the FIG. 2 arrangement the ratio of the mixing length L to the duct hydraulic diameter is about 3.

ASPIRATOR CONNECTION TO THE AIR CLEANER BOX

The described aspirator mechanism (chamber 80 and associated orifice 56) is connected to the aforementioned passage means 75, (i.e. the dusty-air outlet originating at air cleaner box 24) such that dust-laden air is drawn out of box 24 and eventually into the gas stream flowing through exhaust duct 27. Passage means 75 is shown connected to a short horizontal passage structure 86, another upwardly angling passage structure 87 (FIG. 2), and a lateral extension 88 of the chamber 80 structure. Passage mechanisms 75, 86, 87 and 88 form one continuous passage means connecting chamber 80 to the dusty-air outlet opening in air cleaner box 24 (FIG. 3). The passage mechanisms are preferably constructed so that the defined passage has a substantially constant flow construction to minimize flow rate changes. The flow is generally horizontal in a direction paralleling duct 27, then laterally into chamber 80.

The connecting passage means can be formed to other configurations than as shown in FIGS. 1, 2 and 5. However the passage should be designed to avoid undue projection into space 40 (FIG. 2). The vehicle transmission and related accessory equipment fully occupy space 40, such that only limited space is available for accommodating the desired passage means.

CHECK VALVE CONSTRUCTION

FIGS. 1 and 5 show a check valve in the form of a flat plate 89 having a hinge connection 90 with the roof section of chamber extension 88. In the absence of any flow forces the plate hangs vertically, as shown in FIG. 5. If the flow force is in a left-to-right direction (FIG. 5) plate 89 will swing to the dashed line position 89a, permitting flow of dust-laden air into chamber 80. If the flow force should be in a right-to-left direction plate 89 will remain in its full line (closed) position.

Normally there will be no right-to-left force on check valve plate 89. The check valve is in the nature of a safety device to prevent reverse flow of dust-laden air into box 24 in the event of system malfunction. Theoretically such a malfunction could occur if the enclosed space 22 (FIG. 2) should become clogged, e.g. large foreign objects admitted through louvered openings 20. In that event the engine compressor units 29, 30 and 32 would temporarily exert a very strong suction force through passage 25, which could be transmitted back through filter panels 74 to the frusto-conical separator tubes 68 (FIG. 4) and the clearance spaces within associated tubes 65. The net effect would be a reverse-acting force in passage 75, tending to draw gas from chamber 80 back toward air cleaner box 24.

If enclosed space 22 (FIG. 2) were to become clogged the combustion process in combustor 46 would likely be disrupted, such that the flow of exhaust gases through duct 27 would be curtailed. There might therefore be a lessened aspirator force at orifice 56, and a reduced force promoting flow from passage member 88 into chamber 80.

Check valve 89 is intended to prevent reverse fluid flow in the passage system between chamber 80 and air cleaner box 24 (which might otherwise occur in even of the described clogged condition). The check valve could be located at various different points along the passage system.

FIG. 8 CONSTRUCTION

Figure 8:
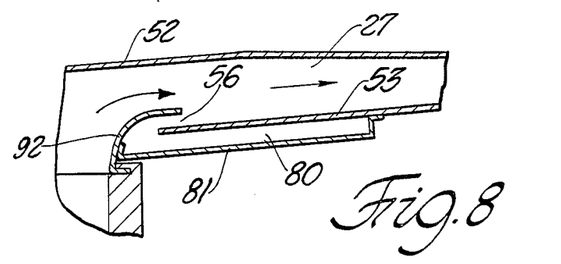
FIG. 8 and 9 are views in the same direction as FIG. 6, but illustrating structural variations that can be employed in practice of the invention.

FIG. 8 illustrates a slight variant of the invention wherein walls 55 and 59 (FIG. 6) are replaced by a single wall 92. Otherwise the FIG. 8 construction is similar to the previously described arrangement.

FIG. 9 CONSTRUCTION

Figure 9:
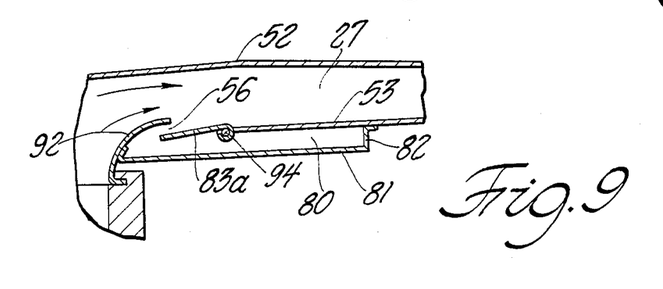

FIG. 9 illustrates another variant of the invention wherein the end area of duct floor 53 takes the form of a plate 83a having a hinged connection 94 with the main portion of the duct floor. Adjustment of plate 83a around the hinge axis can be used to vary the slot width of orifice 56. Such an adjustment might be desirable for different reasons, e.g. to calibrate (optimize) the system, or to compensate for manufacturing tolerances in the size of orifice 56, or to counteract variations in pressure drop across the inertial separator tube units 64, or to minimize air flow through orifice 56 when the vehicle is operating in clean air environments, or to limit the flow rate through orifice 56 when the engine is in its maximum power condition.

Adjustment of plate 83 is generally for the purpose of maintaining a predetermined suction force at each of the inertial separator tube units 64, irrespective of manufacturing or operating variables that would otherwise adversely affect the suction force. The so-called "scavenging flow" through the clearance spaces between tubes 65 and 68 should be sufficient to remove about ninety five percent of the dust in the entering air stream without requiring an excessively high scavenging flow rate. Adjustment or control of the suction force serves to advantageously control the scavenging flow rate and first stage collection efficiency.

ORIFICE DIMENSIONS

The size of orifice 56 is somewhat related to the size of duct 27 and the characteristics of air cleaner 24 (i.e. the scavenger suction requirements). It is contemplated that in general, orifice 56 will have a cross-sectional area about one fourth the cross sectional area of the associated nozzle 71 formed between the upper surface of wall 59 and the lower surface of roof section 52. Some trial-and-error experimentation would be necessary to optimize the size of orifice 56.

PRINCIPAL FEATURE OF THE INVENTION

The general arrangement of air cleaner box 24 and turbine engine 10 is old in the art. Our invention relates primarily to the aspirator mechanism (chamber 80 and orifice 56), and the interconnecting passage between the aspirator and air cleaner box.

The new mechanism is designed to avoid the use of a motor-driven fan heretofore employed to remove dust-laden air from the air cleaner box. The fan was required to move the air at a very high flow rate through the fan blades; erosion of the fan surfaces by the fast-moving dust particles presented a maintenance problem.

The new mechanism is designed to occupy minimum space in the vehicle engine compartment. Chamber 80 is a relatively flat structure having only a small vertical thickness, e.g., less than one fourth the horizontal transverse dimension 91 of the chamber (FIG. 1). Chamber 80 and the passage structure between chamber 80 and box 24 intrude only slightly into space 40 (FIG. 2).

We wish it to be understood that we do not desire to be limited to the exact details of construction shown and described for obvious modifications will occur to a person skilled in the art, without departing from the spirit and scope of the appended claims.

We claim:

1. In a military vehicle, a turbine engine comprising an elongated structure having an air intake opening at one of its ends and a horizontally oriented exhaust opening at its other end for discharging combustion gases vertically and upwardly; an elongate exhaust duct connected to said exhaust opening for conducting combustion gases from the engine to a point outside the vehicle; said exhaust duct extending generally horizontally away from the engine in a plane above the plane of the exhaust opening; an air cleaner box having a first end and a second end; clean air passage means extending from said first end of the box to the engine air intake opening, and dirt-laden air passage means extending from the second end of the box:

the improvement comprising an elbow section in the exhaust duct, the elbow section communicating directly with the exhaust opening for turning the upflowing gases horizontally as said gases move out of the exhaust opening; and an aspirator means connected to said dirt-laden air passage means for introducing the dirt-laden air to the gas stream flowing through said exhaust duct; said aspirator means including a chamber means underlying the exhaust duct, and means connecting the defined chamber to the interior of the exhaust duct; the connecting means defining a slot-like orifice located in a lower portion of the exhaust duct immediately downstream from the gas-turning zone defined by the aforementioned elbow section.

2. The improvement of claim 1 wherein said elbow section is comprised of a curved wall that defines the inner boundary of the gas-turning zone, the curved wall extending upward and rearward through approximately a quarter-circle turn; the downstream edge of said curved wall forming an upper boundary surface for the defined orifice.

3. The improvement of claim 2 wherein the exhaust duct is comprised of a roof section and a duct floor section; the upstream, forward edge of the duct floor section being located below the downstream edge of the aforementioned curved wall; wherein the chamber means has a chamber floor whose downstream, rearward portion is disposed below the rearward edge of the duct floor section and is connected to the base of the curved wall, whereby the rearward portion of the chamber floor, the rearward portion of the duct floor and the curved wall together define a U-turn connection between the chamber means and the slot-like orifice.

4. The improvement of claim 3 wherein the downstream edge of the curved wall cooperates with the duct roof section to form a nozzle; the downstream edge of the curved wall being located so that the nozzle area is about four times the orifice area.

5. The improvement of claim 4 wherein the upstream edge of said floor section is located slightly upstream from the plane of the defined orifice, whereby the dust-laden air is required to flow over the upper surface of the floor section before reaching the slot-like orifice.

6. The improvement of claim 5 wherein the exhaust duct is comprised of a flat roof, a flat floor, and interconnecting side walls, whereby the duct has a rectangular cross section normal to the gas flow path; said chamber means extending underneath the duct for its entire width, measured between the duct side walls; the slot-like orifice having a transverse dimension substantially coextensive with the transverse spacing between the duct side walls.

7. The improvement of claim 6 wherein the horizontal transverse dimension of the chamber means is at least four times the vertical dimension of the chamber means.

8. The improvement of claim 7 wherein the exhaust duct includes an air-gas mixing section (L) extending downstream from the slot-type orifice; said mixing section being of substantially constant cross section at all points therealong; the length of the mixing section being between three and six times the hydraulic diameter of the mixing section.

9. The improvement of claim 8 and further comprising a check valve preventing gas flow from said chamber means into the dirt-laden air passage means.

10. The improvement of claim 9 wherein the chamber means extends underneath the exhaust duct for its entire width, as measured between the duct side walls; said chamber means being tapered in the direction of air flow, whereby air flow through the slot-like oriface is substantially uniform from one side of the slot-like orifice to the other.

11. The device of claim 10 wherein the air cleaner box contains a receptacle means for separating dirt from engine intake air, the receptacle means being open at one end to the dirt-laden air passage means and closed at the other end; the receptacle comprising;

(a) a pair of opposed rectangular plates wherein one plate is exposed to raw air entering the air cleaner box, the other plate is exposed to the clean air passage means, and each plate defines a multiplicity of holes therein;

(b) a multiplicity of inertial separator tube units connected between the plates open at the holes in the plates, the tube units being separated into a plurality of groups;

(c) a rectangular wall between the plates surrounding each group of tube units and defining secondary cavities within the receptacle;

(d) a proximal end wall bounding the end of each secondary cavity closer to the open end of the receptacle;

(e) a distal end wall bounding the end of each secondary cavity further from the open end of the receptacle;

(f) a pair of opposed sidewalls connecting the end walls of each secondary cavity, the sidewalls defining with the one plate a gap tapering from the distal end wall toward the proximal end wall;

(g) a plurality of imperforate panels extending between the opposed sidewalls of each secondary cavity, thereby dividing the secondary cavities into tertiary cavities opening at portions of the tapered gaps.

12. The device of claim 11 wherein the dirt-laden air passage means extends horizontally from the air cleaner box generally parallel to the exhaust duct, and then laterally to the chamber means; the chamber means having a relatively small vertical dimension whereby the chamber means intrudes only slightly into the space beneath the exhaust duct.

13. The device of claim 11 wherein the exhaust duct defines an elimination oriface for discharging exhaust gas to an area external to the engine and wherein the elimination oriface, the slot-like oriface and exhaust opening of the engine are the only orifaces communicating with the exhaust duct.

14. In a vehicle, a turbine engine having an air intake passage and comprising an elongate structure defining at its rearward end a horizontally oriented exhaust opening for discharging combustion gases vertically upwardly; an elongate exhaust duct connected to the exhaust opening to carry combustion gases away from the engine; the exhaust duct extending generally rearwardly and horizontally away from the engine in a plane above the plane of the exhaust opening; an air cleaner means for accepting raw air from the environment and separating the raw air into relatively clean air and relatively dirt-laden air; a clean air passage means connecting the engine air intake opening to a first end of the air cleaning means; a scavenger passage means for conducting dirt-laden air from a second end of the air cleaning means toward the exhaust duct; and an aspirator means receiving dirt-laden air from the scavenger passage means and having an aspirator oriface for introducing dirt-laden air into the exhaust duct; the improvement wherein:

(a) the exhaust duct duct has an elbow section communicating directly with the exhaust opening for turning the upflowing gases horizontally as the gases move out of the exhaust opening, the inside turn of the elbow section being defined by an elbow section wall whose base is disposed along the rear edge of the exhaust opening and whose top terminates in a horizontal rearwardly extending flange, wherein a first surface of the elbow section wall facing the interior of the elbow section extends upward from the wall base and curves rearwardly to meet the horizontal flange;

(b) the exhaust duct has a horizontal duct floor whose forward, upstream edge extends below the rearwardly extending flange of the elbow section wall whereby the rearward edge of the horizontal flange and the portion of the duct floor directly thereunder form the top and bottom of the aspirator oriface;

(c) the aspirator means includes a flat chamber underlying the duct floor for receiving dirt-laden air from the scavenger passage means, the chamber having a vertically oriented effluent oriface faced towards the elbow section wall and a chamber floor extending beyond the chamber effluent oriface to the base of the elbow section wall;

(d) the aspirator means further includes an essentially semi-cylindrical surface of the elbow section wall, the semi-cylindrical surface facing the forward, upstream edge of the horizontal duct floor, whereby the duct floor, the chamber floor and the elbow section wall together define a U-shaped floor path for the dirt-laden air exiting the chamber through the effluent oriface, and whereby the rear edge of the elbow section wall defines with the duct floor an aspirator oriface through which dirt laden air enters the exhaust duct.

15. The device of claim 14 wherein the exhaust duct defines an elimination opening for discharging engine exhaust gas to an area external to the engine and wherein the elimination opening, the apirator oriface and the exhaust opening of the engine are the only orifaces communicating with the exhaust duct.

16. The improvement of claim 15 wherein the scavenger means extends horizontally from the air cleaning means generally parallel to the exhaust duct, and then laterally to the flat chamber, and wherein the width of the effluent passage of the chamber is coentensive with the width of the duct.

17. The improvement of claim 16 including a means for establishing an even air flow from the air cleaning means through the aspirator means, the establishing means comprising a chamber wall obliguely facing the effluent opening of the chamber so that the chamber tapers in the direction of air flow entering the chamber, whereby air flow through the effluent oriface is substantially uniform from one side of the effluent oriface to the other.

18. The device of claim 17 wherein the air cleaner means has a raw air injection opening and includes a rectangular receptacle closed at one end and open at the other end for communication with the dirt-laden air passage means; the receptacle comprising:

(a) a pair of opposed rectangular plates wherein one plate is exposed to raw air entering the air cleaner means, the other plate is exposed to the clean air passage means, and each plate defines a multiplicity of holes therein;

(b) a multiplicity of internal separator tube units connected between the plates at the holes in the plates;

(c) a rectangular wall between the plates defining secondary cavities within the receptacle for segregating the tube units into a plurality of groups; the secondary cavities each having a proximal end wall and a distal end wall, the proximal end wall bounding the end of each secondary cavity closer to the open end of the receptacle and the distal end wall bounding the end of each secondary cavity further from the open end of the cylinder;

(d) A pair of opposed sidewalls bounding the sides of each secondary cavity, the sidewalls defining with the one plate an gap tapering from the distal end wall toward the proximal end wall;

(e) A plurality of imperforate panels extending between the opposed sidewalls of each secondary cavity, thereby dividing the secondary cavities into tertiary cavities opening at portions of the tapered gaps.

19. The improvement of claim 18 wherein the exhaust duct includes an air-gas mixing section (L) extending downstream from the slot-type oriface; the mixing section having a substantially constant cross section at all points therealong; the length of the mixing section being between three and six times the hydraulic diameter of the mixing section.

20. The improvement of claim 19 further comprising a check valve preventing gas flow from the chamber into the scavenger passage means.

* * * * *